G. SOLDANI.
COMBINED TIRE ARMOR AND ANTISKID DEVICE.
APPLICATION FILED OCT. 9, 1918.
1,373,985.
Patented Apr. 5, 1921.
2 SHEETS—SHEET 1.
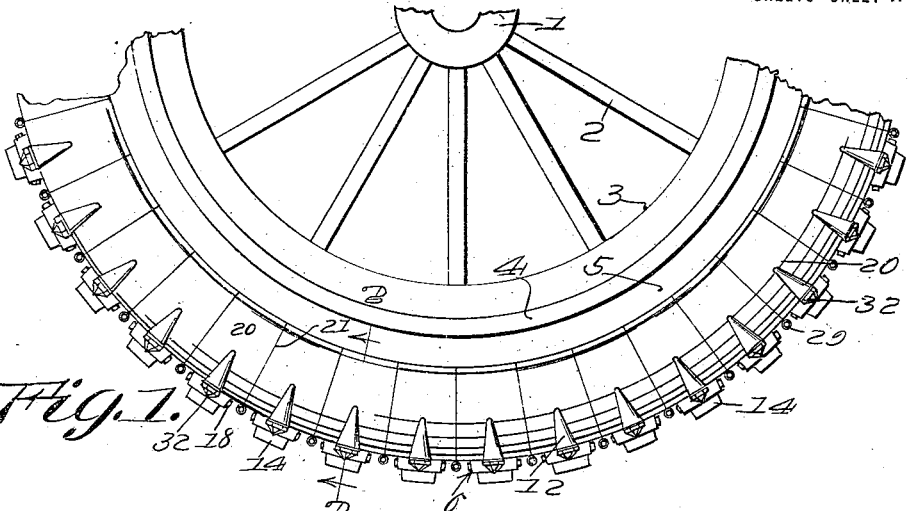
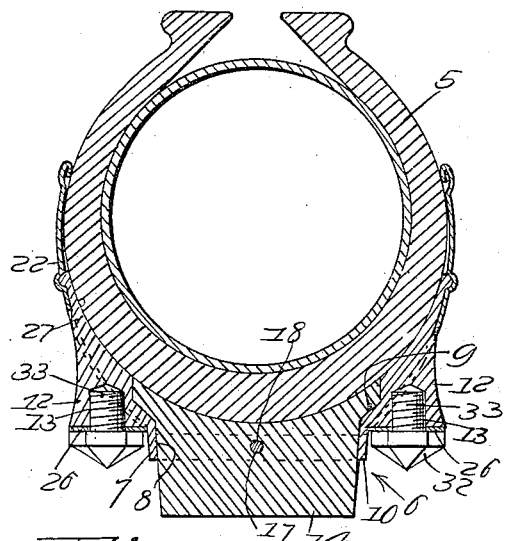
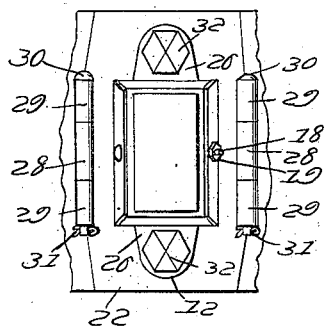
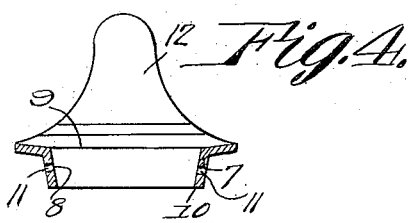
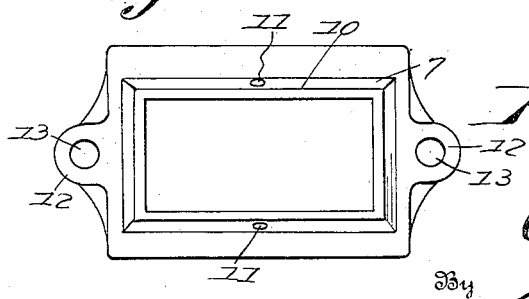
Inventor
Girolamo Soldani,
By
Attorney

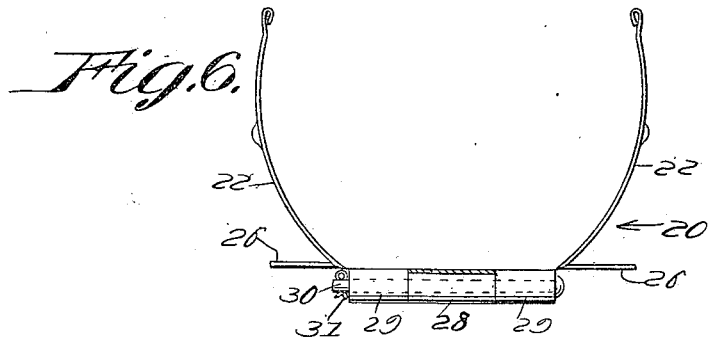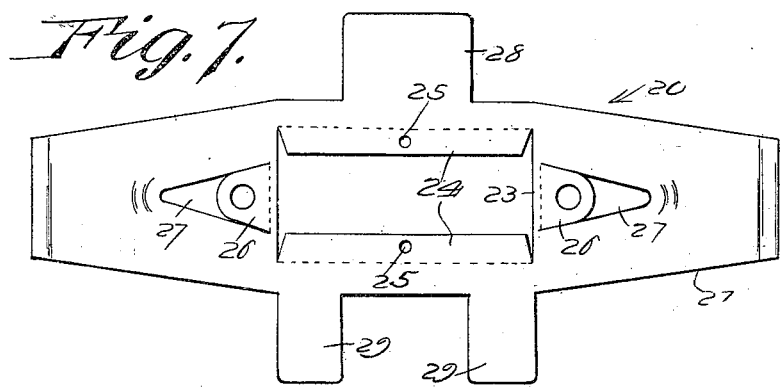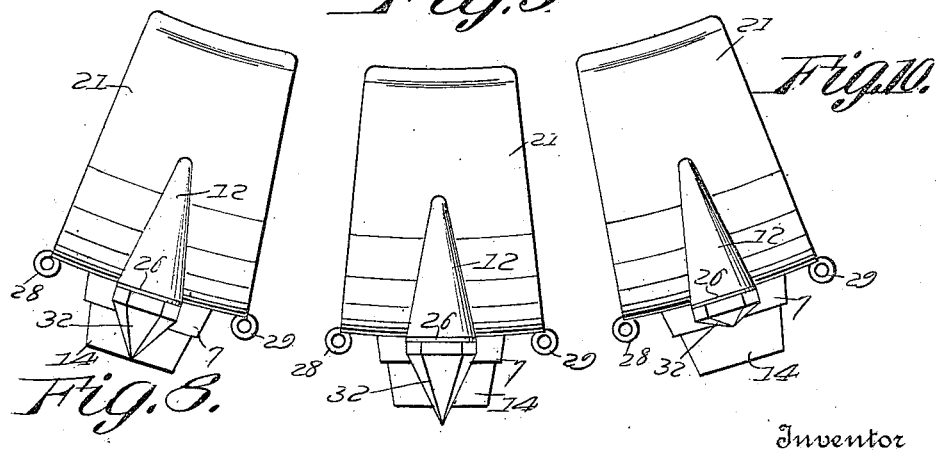

UNITED STATES PATENT OFFICE.

GIROLAMO SOLDANI, OF SPENCER, MASSACHUSETTS.

COMBINED TIRE-ARMOR AND ANTISKID DEVICE.

1,373,985. Specification of Letters Patent. Patented Apr. 5, 1921.

Application filed October 9, 1918. Serial No. 257,447.

*To all whom it may concern:*

Be it known that I, GIROLAMO SOLDANI, a citizen of the United States, residing at Spencer, in the county of Worcester and State of Massachusetts, have invented new and useful Improvements in Combined Tire-Armor and Antiskid Devices, of which the following is a specification.

The invention has reference generally to improvements in that class of inventions known as resilient wheels and more particularly relates to a combined tire armor and anti-skid device.

As the primary aim and object, the present invention contemplates the provision of a device of the above mentioned character designed to be readily attached about the tire of a motor vehicle so as to avoid skidding of the vehicle on wet and icy roads or streets and at the same time is capable of protecting the tire to prevent punctures and undue wear thereof.

More particularly this invention consists in the provision of a device of the above mentioned character composed of a plurality of sections movably connected to each other and designed to be disposed about the outer surface of the tire casing while the sections are so related that any one may be replaced if injured.

It is an additional object of this invention to provide a device of the above mentioned character wherein a casting of a novel construction is employed and is designed to accommodate a block of rubber.

As a further improvement this invention embraces the provision of a retaining and clamping plate for the casting designed from a single blank of material and arranged so as to retain the casting in the proper position when embraced about the tire casing improved means being also employed for movably connecting the plates of each section together.

It is a more specific object of this invention to provide a device of the above mentioned character wherein an anti-skid of improved construction is employed and is designed so as to fasten the plate and casting together.

It is an additional object of this invention to provide a device of the above mentioned character which is simple in construction, thoroughly reliable and efficient in its purpose and inexpensive in manufacture.

Other objects will be in part obvious and in part hereinafter set forth.

The invention accordingly consists in the features of construction, the combination of elements and the arrangement of parts which will be exemplified in the construction hereinafter described and the scope of the application of which will be indicated in the appended claims.

The invention is clearly illustrated in the accompanying drawings, in which—

Figure 1 is a fragmentary side elevation of the wheel showing the device applied thereto.

Fig. 2 is an enlarged transverse section of the device in position on the tire casing.

Fig. 3 is a plan of a tread section.

Fig. 4 is a transverse sectional view of the structure shown in Fig. 5.

Fig. 5 is a top plan view of the casting.

Fig. 6 is an end elevation of the clamping plate.

Fig. 7 is a top plan view of the blank from which the clamping plate is formed.

Fig. 8 is an elevational detail of one form of stud.

Fig. 9 is an elevational detail of another form of stud, and

Fig. 10 is an elevational detail of still another form of stud.

Similar characters of reference are employed in all of the above described views, to indicate corresponding parts.

Referring now, more particularly, to the accompanying drawings, there is illustrated a portion of a motor vehicle wheel which consists generally of a hub 1 from which project spokes 2 connected at the outer end by a felly 3 which carries a rim 4 for accommodating a pneumatic tire casing 5 of a conventional construction while removably arranged in position about the tread and sides of the tire casing is an improved tire armor and anti-skidding device indicated in its entirety by the numeral 6.

In the present instance this device may be said to consist of a plurality of movably connected sections and each section is composed of an arcuate metallic casting 7 formed medially of its ends with an opening 8 the inner edge of which is shouldered as at 9 while a substantially rectangular frame 10 is formed on the outer face of the casting about the opening, the opposite side portions thereof being formed with registering openings 11 for a purpose that will presently appear. Formed integral with the opposite sides and on the outer surfaces of the casting 7 are enlargements 12 which are in turn provided with inwardly extending and threaded sockets 13 also for a purpose that will presently appear. Removably fitted within the opening in the frame from the inner side of the casting is a block 14 formed preferably of rubber the inner edge thereof being enlarged or flanged as at 15 and this portion 15 abuts the shoulder while the inner surfaces curve arcuating so as to lie flush and conform to the inner surface of the casting. The outer portion of the block projects through and beyond the frame as indicated and when the device is applied in a manner hereinafter to become apparent serves as a means for protecting the tire casing 5 and preventing skidding.

The block is also formed with a transverse opening 17 and is retained in position by means of an elongated bolt 18 which also passes through the opening 11 and has the outer end engaged by a nut 19.

A clamp generally designated by the numeral 20 is now employed and is formed from a single blank of resilient sheet metal being preferably of rectangular configuration having the opposite side edges near the respective ends tapered as at 21 and this blank is bent into an arcuate configuration in cross-section the end portions thereof being off-set inwardly as at 22 near their terminals for a purpose that will presently appear. The medial portion of the plate is formed with a centrally disposed rectangular opening 23. At the time the opening is formed opposed flanges 24 are struck out from the plate and lie on the opposite sides of the opening, as indicated, being formed with opposed registering apertures 25. The side portions of the plate in proximity to the central opening are struck outwardly to provide ears 26 leaving triangular openings 27 slightly longer than the ears. In this connection it is to be observed that the ears are designed to be arranged in the same plane and substantially flush with the medial portion of the plate so that when the end portions of the plate, which act as clamps, are straddled about the tire casing the opening 23 will be disposed about the frame on the casting while the openings 27 will be disposed about the enlargements 12 to permit of the ears to engage the outer faces of the enlargements and aline with the recess 13 therein. In addition the openings 25 aline with the openings 11 and the opening 17 in the block and are also engaged by the bolt 18 while the nut 19, of course, serves to clamp these parts together. A single hinge ear 28 projects from one side edge of the medial portion of each clamp while spaced hinges 29 project from the opposite side edge of the medial portion of each plate and are designed to be straddled about the single hinge ear 28 on the adjacent plate.

In connecting the clamping plates of each section together bolts 30 are passed through the hinge ears and have their terminals engaged by suitable retainers such as cotter pins 31. In order to prevent skidding of the device and at the same time secure the ears to the enlargement to increase the rigidity between the clamping plate and the adjacent casting suitable anti-skidding studs are employed. In the present instance there are three forms of studs disclosed and indicated in Figs. 8 to 10, inclusive, each stud generally consists of a pointed head 32 and a threaded shank 33 which is passed through the ear and engaged in the threaded recess 13 in the enlargement. The form of stud shown in Fig. 8 has a pointed head 32 lying substantially flush with the outer face of the block and is particularly designed for use in cold weather. The pointed head of the form shown in Fig. 9 projects beyond the outer face of the block and is designed particularly for use on icy roads and streets while the form shown in Fig. 10 has a pointed head terminating short of the outer face of the block and designed for use in hot weather. Each of the heads of the studs near the shank are substantially hexagonal shaped to facilitate adjustment when engaged by a wrench or other tool.

In assembling the parts, assuming that they have been constructed as described, the blocks 14 are first fitted in the opening 8 in the frame of the castings whereupon the clamps are engaged over the castings as indicated in Fig. 2. The bolt 18 is now passed through the alining openings 25, 11 and 17 and has a threaded terminal engaged by the nut 19 so as to hold the block, casting and clamp together. The studs now have their threaded shanks engaged through the ears and anchored in the recess 13 in the enlargements. The bolts 30 are now engaged between the majority of the clamps whereupon they are straddled about the tire casing, the off-sets 22 allowing the end portions of the clamps to frictionally engage the outer surfaces of the sides of the casing 5. Finally one of the bolts 30 is engaged through the adjacent end sections to retain the parts in proper position about the casing. The inclined though tapered side edges of the clamps, of course, permit of the proper arrangement of the device about the tire casing and are designed so as to permit of the slight compressing of the casing without distorting the device. By this construction and arrangement it is apparent that any of the parts may be replaced when worn out or injured. This is especially true of the rubber blocks which wear out when subjected to continuous use.

It is believed in view of the foregoing description that a further detailed description of the invention is entirely unnecessary. Likewise it is believed that the advantages of the invention will be readily apparent.

What is claimed is:

1. A device of the character described including a plurality of sections each of which consists of a casting, a block fitted in the casting and a clamp fitted about the casting and through which the block projects, common means securing the block, casting and clamp together, and means movably connecting the clamps of each section together.

2. A device of the character described comprising a plurality of sections each of which includes a casting, a block fitted in the casting and a clamp embracing and retaining the casting and through which the block projects, common means securing the block, casting and clamp together, anti-skidding studs anchoring the clamp to the casting, and means movably connecting the clamps of each section together.

In testimony whereof I affix my signature.

GIROLAMO SOLDANI.